United States Patent
Fujimori

(10) Patent No.: US 10,412,776 B2
(45) Date of Patent: Sep. 10, 2019

(54) COMMUNICATION APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Yuki Fujimori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 62 days.

(21) Appl. No.: 15/864,281

(22) Filed: Jan. 8, 2018

(65) Prior Publication Data
US 2018/0206283 A1   Jul. 19, 2018

(30) Foreign Application Priority Data
Jan. 17, 2017   (JP) .................................. 2017-006101

(51) Int. Cl.
| | | |
|---|---|---|
| *H04W 4/00* | (2018.01) | |
| *H04W 76/15* | (2018.01) | |
| *H04W 56/00* | (2009.01) | |
| *H04W 8/00* | (2009.01) | |
| *H04W 4/08* | (2009.01) | |
| *H04W 48/16* | (2009.01) | |
| *H04W 48/18* | (2009.01) | |
| *H04W 84/18* | (2009.01) | |

(Continued)

(52) U.S. Cl.
CPC ............. *H04W 76/15* (2018.02); *H04W 4/08* (2013.01); *H04W 4/80* (2018.02); *H04W 8/005* (2013.01); *H04W 48/16* (2013.01); *H04W 48/18* (2013.01); *H04W 56/001* (2013.01); *H04W 84/18* (2013.01); *H04W 40/32* (2013.01); *H04W 56/0015* (2013.01); *H04W 84/12* (2013.01)

(58) Field of Classification Search
CPC ......... H04W 76/15; H04W 4/80; H04W 4/08; H04W 8/005; H04W 48/16; H04W 48/18; H04W 84/18; H04W 56/001
USPC .................................. 370/328–330, 335–348
See application file for complete search history.

(56) References Cited

U.S. PATENT DOCUMENTS 9,432,925 B2 *   8/2016   Kasslin ................. H04W 48/18
9,480,013 B2 *  10/2016   Fang .................... H04W 48/16
(Continued)

FOREIGN PATENT DOCUMENTS

EP        2894935 A1        7/2015

OTHER PUBLICATIONS

Extended European Search Report issued in European Appln. No. 17210804.5 dated Apr. 17, 2018.

*Primary Examiner* — Thai D Hoang
(74) *Attorney, Agent, or Firm* — Rossi, Kimms & McDowell LLP

(57) ABSTRACT

A communication apparatus capable of communicating with another communication apparatus in a network conforming to NAN (Neighbor Awareness Networking), while joining a first NAN cluster included among a plurality of NAN clusters, detect an existence of a second NAN cluster included among the plurality of NAN clusters, compares an attribute value of the second NAN cluster with an attribute value of the first NAN cluster, and, when the attribute value of the second NAN cluster is lower than the attribute value of the first NAN cluster, transmits information indicating an existence of the first NAN cluster to the second NAN cluster.

15 Claims, 10 Drawing Sheets

(51) Int. Cl.
*H04W 4/80* (2018.01)
*H04W 40/32* (2009.01)
*H04W 84/12* (2009.01)

(56) References Cited

U.S. PATENT DOCUMENTS

| | | | |
|---|---|---|---|
| 9,888,438 B2* | 2/2018 | Fang | H04W 48/16 |
| 10,004,033 B2* | 6/2018 | Kasslin | H04W 48/18 |
| 10,123,260 B2* | 11/2018 | Shmukler | H04W 48/16 |
| 2014/0302787 A1 | 10/2014 | Rantala et al. | |
| 2015/0098388 A1 | 4/2015 | Fang et al. | |
| 2016/0309493 A1* | 10/2016 | Shmukler | H04W 48/16 |
| 2016/0345242 A1 | 11/2016 | Kim et al. | |
| 2019/0045431 A1* | 2/2019 | Shmukler | H04W 48/16 |

\* cited by examiner

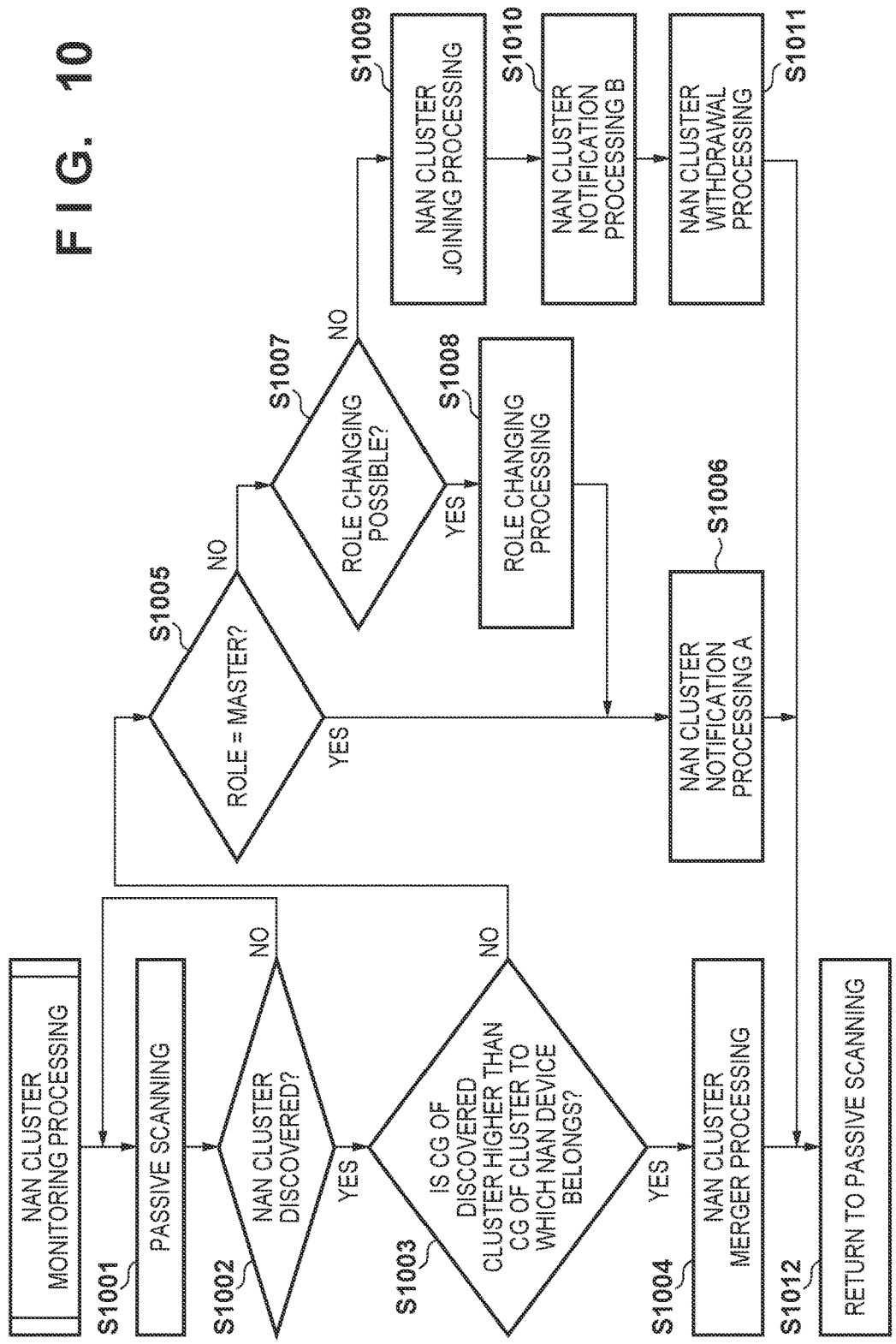
F I G. 10

COMMUNICATION APPARATUS, CONTROL METHOD THEREFOR, AND NON-TRANSITORY COMPUTER-READABLE STORAGE MEDIUM

BACKGROUND OF THE INVENTION

Field of the Invention

The present invention relates to a communication apparatus, a control method therefor, and a non-transitory computer-readable storage medium.

Description of the Related Art

A wireless LAN (Local Area Network) system, typically the IEEE 802.11, has been widely used. In a wireless LAN, the network is controlled by a base station called an access point (hereinafter, AP). The wireless network is constituted by this AP and a station (STA) that is present within a range reached by the radio waves of the AP and that is in a wirelessly connected state. In recent years, not only a simple wireless network configuration including such a conventional AP and STA, but also products and specification standards of a variety of wireless LAN network formats have appeared.

Neighbor Awareness Networking (NAN) has been specified by the Wi-Fi Alliance as a standard of communication for discovering, for example, communication apparatuses and services provided by the communication apparatuses with low power (see U.S. Patent Application Publication No. 2014/302787). According to NAN, periods in which the communication apparatuses composing NAN (hereinafter, NAN devices) exchange information are synchronized. This can shorten a period in which wireless RFs are enabled, and save power. In NAN, a period for such synchronization is called Discovery Window (DW). Furthermore, a group of NAN devices that share predetermined synchronized periods is called a NAN cluster.

NAN devices are located within a NAN cluster, and can play one of the following roles within the NAN cluster: Master, Non-Master Sync, and Non-Master Non-Sync. A terminal with a role of Master (hereinafter referred to as a Master device) transmits Discovery Beacon in a non-DW period within a set interval. Discovery Beacon is a signal for informing NAN devices that belong to another NAN cluster and NAN devices that do not belong to any NAN cluster of the existence of the NAN cluster to which the Master device belongs. Note that information of another NAN cluster can also be included in Probe Response and later-described Synchronization Beacon.

When a NAN device has detected the existence of another NAN cluster via Discovery Beacon, two different NAN clusters can be integrated into one by merging the NAN clusters. Specifically, a NAN device that has received Discovery Beacon transmitted from a Master device of another NAN cluster compares Cluster Grades between NAN clusters, and joins another NAN cluster when Cluster Grade of another NAN cluster is high. Cluster Grade is a unique attribute (attribute value) that is set on a per-cluster basis. When the NAN device that has joined another NAN cluster has a role of Master or Non-Master Sync, it transmits, to the NAN cluster to which it originally belonged, Synchronization Beacon including information of the NAN cluster to which it has newly joined. NAN devices that have received this Synchronization Beacon also join the new NAN cluster, with the result that the NAN clusters are merged as a whole.

A Master device also transmits Synchronization Beacon, which is a signal for enabling synchronization among NAN devices in the same NAN cluster, within a DW. Information of another NAN cluster can be included in this Synchronization Beacon to be announced. Once the synchronization has been established, the NAN devices within the NAN cluster transmit and receive a Subscribe message, which is a signal for searching for a service, and a Publish message, which is a signal for sending a notification indicating that the service is provided, to and from one another in a DW period. Furthermore, each NAN device can exchange a Follow-up message for exchanging additional information related to the service in a DW period. Frame structures of such messages as the Publish message, Subscribe message, and Follow-up message are defined by the NAN standard, and are called Service Discovery Frames (SDFs). SDFs include Service ID, which is an identifier for specifying a target service. As NAN devices exchange SDFs to one another, services can be discovered and detected.

By integrating NAN clusters, services can be searched for from among a larger number of NAN devices. For example, assume a case where a NAN device A belonging to a NAN cluster 1 intends to use a service of a NAN device B belonging to a NAN cluster 2. At this time, as a DW period is set for each NAN cluster, there is a high possibility that the NAN clusters 1 and 2 have different DW periods. If their DW periods are different, the NAN devices A and B cannot receive SDFs from each other even if the distance therebetween allows radio waves to reach the NAN devices A and B, because they need not receive data transmitted from another device in a non-DW period. At this time, SDFs can be received from each other and the service can be discovered by merging the NAN clusters and integrating the DW periods into one.

As described above, when a NAN device has discovered a NAN cluster (high-Grade NAN cluster) that has higher Cluster Grade than a NAN cluster (low-Grade NAN cluster) to which it belongs, it can join the high-Grade NAN cluster via merger processing. However, even if a NAN device has discovered a NAN cluster (low-Grade cluster) that has lower Cluster Grade than a NAN cluster (high-Grade cluster) to which it belongs, the merger processing is not executed unless a NAN device in the low-Grade NAN cluster discovers the high-Grade NAN cluster. In this case, the NAN device in the high-Grade NAN cluster faces the problem of not being able to join the low-Grade NAN cluster.

SUMMARY OF THE INVENTION

In view of the foregoing problem, the present disclosure provides a solution for facilitating the merger between multiple groups that are made up of multiple communication apparatuses when such multiple groups exist.

According to one aspect of the present invention, there is provided a communication apparatus capable of communicating with another communication apparatus in a network conforming to NAN (Neighbor Awareness Networking), comprises: a detection unit configured to, while joining a first NAN cluster included among a plurality of NAN clusters, detect an existence of a second NAN cluster included among the plurality of NAN clusters; a comparison unit configured to compare an attribute value of the second NAN cluster with an attribute value of the first NAN cluster; and a transmission unit configured to, when the attribute value of the second NAN cluster is lower than the attribute value of the first NAN cluster, transmit information indicating an existence of the first NAN cluster to the second NAN cluster.

Further features of the present invention will become apparent from the following description of exemplary embodiments (with reference to the attached drawings).

BRIEF DESCRIPTION OF THE DRAWINGS

FIG. 10 is a flowchart of NAN cluster monitoring processing according to a third embodiment.

DESCRIPTION OF THE EMBODIMENTS

Figure 1:
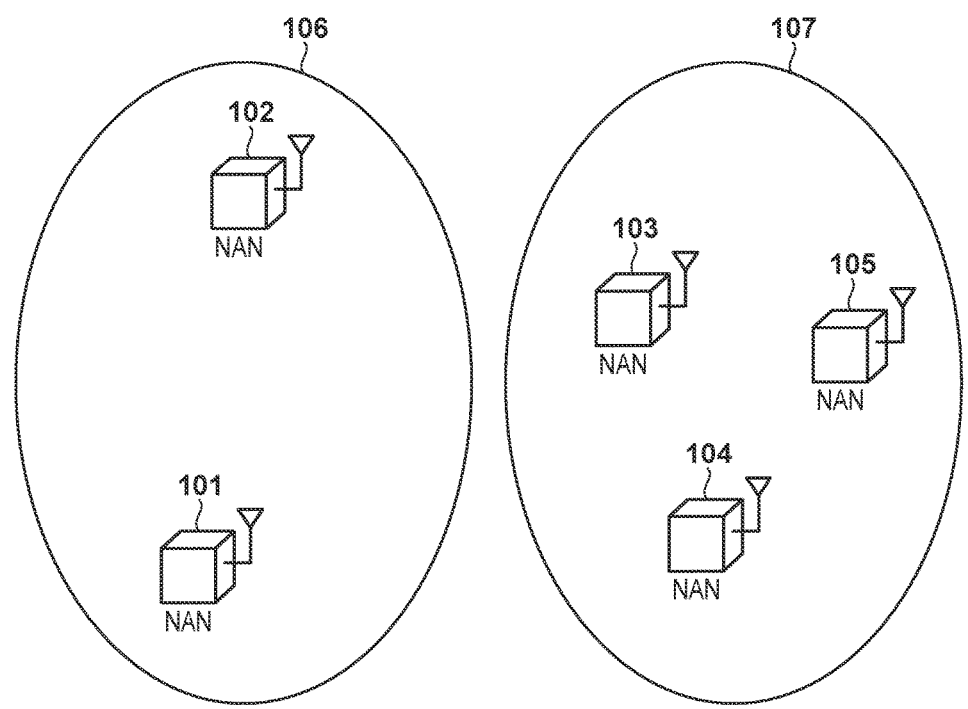
FIG. 1 shows a wireless network configuration according to an embodiment.

The following describes the present invention in detail based on embodiments thereof with reference to the attached drawings. Note that the configurations presented by the following embodiments are merely examples, and the present invention is not limited to the configurations shown in the drawings.

First Embodiment

FIG. 1 shows an exemplary configuration of a network according to the present embodiment. The following describes an example in which a wireless LAN system conforming to the Neighbor Awareness Networking (NAN) standard is used.

NAN devices 101, 102, 103, 104, and 105 are wireless communication apparatuses to which the present embodiment is applied and which are compliant with the NAN standard. Note that the NAN devices 101, 102, 103, 104, and 105 may be apparatuses of any type, such as cameras, printers, smartphones, and PCs, as long as they can join a NAN cluster and can perform communication using an application. The NAN devices 101, 102, 103, 104, and 105 can discover and provide peripheral communication apparatuses and services provided thereby based on the NAN standard.

In FIG. 1, the NAN devices 101 and 102 are joining a NAN cluster 106, and the NAN devices 103, 104, and 105 are joining a NAN cluster 107. The NAN devices 101 and 102 can communicate with each other in the NAN cluster 106, and the NAN devices 103, 104, and 105 can communicate with one another in the NAN cluster 107. Master Rank specified by the NAN standard is set in each NAN device. Master Rank is a factor for deciding on a role within a NAN cluster. Master Rank is decided on by the following expression based on Master Preference set for each NAN device, Random Factor which is a random value, and a MAC of an interface address: Master Rank=Master Preference$*2^{56}$+Random Factor$*2^{48}$+MAC[5]$*2^{40}$+ . . . +MAC[0]. The higher Master Rank of a NAN device, the higher the likelihood that the NAN device has a role of Master; the lower Master Rank of a NAN device, the higher the likelihood that the NAN device is Non-Master Non-Sync. Especially, a NAN device with the highest Master Rank within a NAN cluster is called Anchor Master, which is a device that serves as a reference in synchronizing time in the NAN cluster.

The NAN standard recommends that Master Rank of a NAN device that is stably joining a NAN cluster, for example, a NAN device that is driven by a power source and does not move in position, be increased. It also recommends that Master Rank of a NAN device that is driven by a battery or that has a possibility of not being stably present in a NAN cluster, such as a mobile terminal, be reduced. A NAN cluster can be stably maintained as a NAN device stably remaining within a NAN cluster serves as Master and transmits a synchronization signal.

A NAN device can change Master Rank by changing Master Preference, and in consequence, can change a role in accordance with relative relationships with Master Ranks of peripheral NAN devices. Note that according to the NAN specifications, once Master Preference has been changed, Master Preference cannot be changed for a duration of 240 DW (=240*512*1024 μs).

Cluster Grade, which is specified by the NAN standard as a unique attribute (attribute value), is set in each NAN cluster. Cluster Grade is set by the calculation formula CG=$2^{64}$*A1+A2, where A1 is Master Preference of Anchor Master, and A2 is a TSF (Time Synchronization Function) value. The NAN specifications specify merger into a cluster with high Cluster Grade when a NAN device belonging to a specific NAN cluster discovers another cluster. In the present embodiment, it will be assumed that the NAN cluster 107 has lower Cluster Grade than the NAN cluster 106.

The NAN cluster 106 is a network joined by the NAN devices 101 and 102, and the NAN cluster 107 is a network joined by the NAN devices 103, 104, and 105. In the present embodiment, each of the NAN devices joining the NAN clusters 106 and 107 constructs a network using channel 6 in the 2.4-GHz frequency band. Within a network of each NAN cluster, Discovery Window (DW), which is a periodic communication period, is 16 TUs (Time Units), and there is an interval of 512 TUs between the start of DW to the start of next DW. Note that the wireless channel of NAN and the configuration of DW are not limited in this way.

Figure 2:
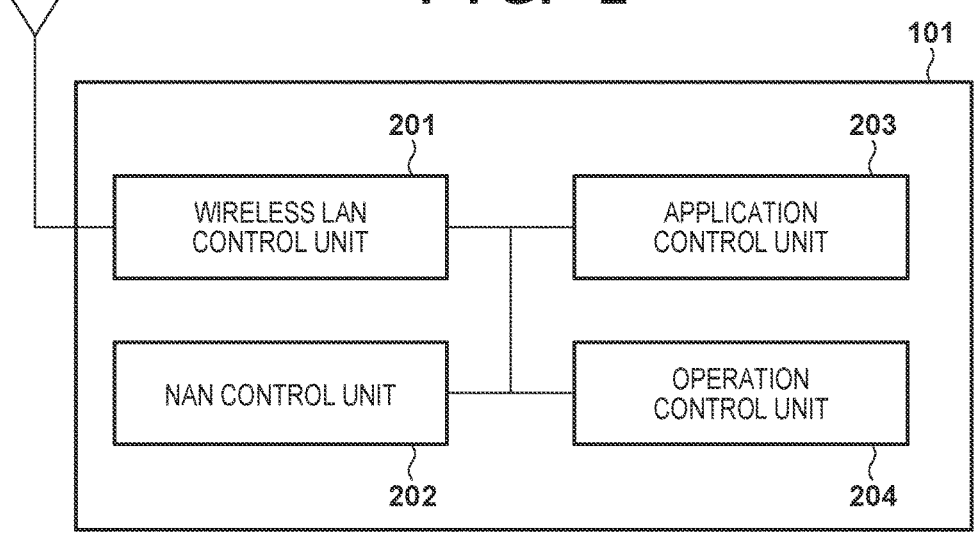
FIG. 2 shows a functional configuration of a NAN device according to an embodiment.

FIG. 2 shows a functional configuration of the NAN device 101. Note that the functional configurations of the NAN devices 102, 103, 104, and 105 are similar to the functional configuration of the NAN device 101. A wireless LAN control unit 201 performs control to transmit and receive a wireless signal to and from another wireless LAN apparatus. The wireless LAN control unit 201 also performs wireless LAN control compliant with the IEEE 802.11. A NAN control unit 202 performs control compliant with the NAN standard, and executes NAN function initiation processing and operation mode deciding processing that will be described later in the present embodiment. The NAN control unit 202 controls the wireless LAN control unit 201 in accordance with an operation mode that has been decided on in the operation mode deciding processing. Especially, the NAN control unit 202 has a function of increasing the power saving performance by reducing power consumed by a communication unit 306 shown in FIG. 3 through the disablement of a function of the wireless LAN control unit 201 for an appropriate period.

An application control unit 203 controls the initiation and ending of NAN functions by the NAN control unit 202 in accordance with processing of an application, forms a network between devices discovered by NAN, and controls communication of application data. For example, when a user (not shown) of the NAN device 101 has activated an image sharing service application that uses NAN, the application control unit 203 instructs the NAN control unit 202 to execute processing for initiating the NAN functions. Thereafter, a network compliant with the IEEE 802.11 is formed between devices discovered by NAN, and image data is transmitted and received via the formed network. When the application is ended, the application control unit 203 instructs the NAN control unit 202 to execute processing for ending the NAN functions. Note that communication of application data is not limited to the form according to the present embodiment, and may use a NAN network or use another communication standard. An operation control unit 204 manages an operation that has been performed on an input unit 304 (FIG. 3) by the user of the NAN device 101, and informs other control units 201 to 203 of a necessary signal.

Figure 3:
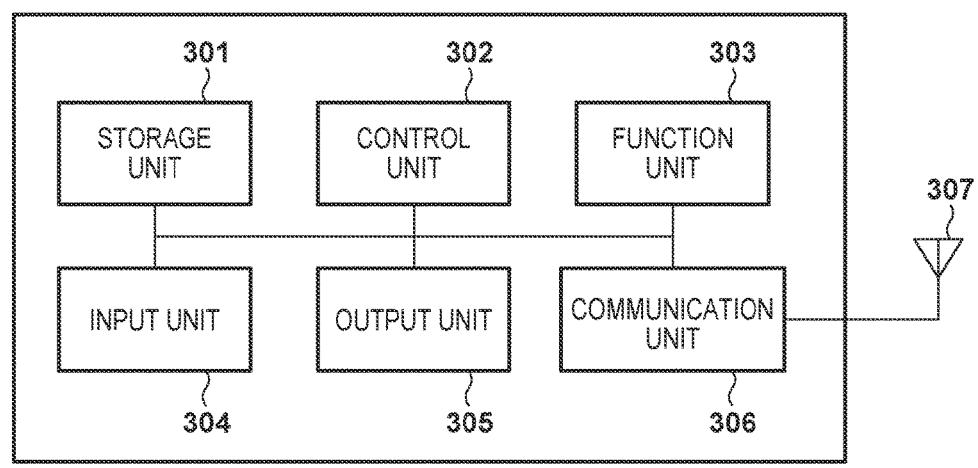
FIG. 3 shows a hardware configuration of a NAN device according to an embodiment.

FIG. 3 shows a hardware configuration of the NAN device 101. Note that the hardware configurations of the NAN devices 102, 103, 104, and 105 are similar to the hardware configuration of the NAN device 101. A storage unit 301 is composed of both or one of a ROM (Read Only Memory) and a RAM (Random Access Memory), and stores programs for performing various types of operations that will be described later and various types of information, such as communication parameters for wireless communication. Note that besides such memories as the ROM, the RAM, and the like, such storage mediums as a flexible disk, a hard disk, an optical disc, a magneto-optical disc, a CD-ROM, a CD-R, a magnetic tape, a nonvolatile memory card, and a DVD may be used as the storage unit 301.

A control unit 302 is composed of one or more CPUs (Central Processing Units) or MPUs (Micro Processing Units), and controls the entire NAN device 101 by executing programs stored in the storage unit 301. Each of the later-described flowcharts is realized by the control unit 302 reading out and executing a program stored in the storage unit 301. Note that the control unit 302 may control the entire NAN device 101 by using programs stored in the storage unit 301 in coordination with an OS (Operating System). The control unit 302 also executes predetermined processing, such as image capture, printing, and projection, by controlling a function unit 303.

The function unit 303 is hardware with which the NAN device 101 executes predetermined processing. For example, in a case where the NAN device 101 is a camera, the function unit 303 is an image capturing unit and executes image capturing processing. Furthermore, for example, in a case where the NAN device 101 is a printer, the function unit 303 is a printing unit and executes printing processing. Furthermore, for example, in a case where the NAN device 101 is a projector, the function unit 303 is a projection unit and executes projection processing. Data processed by the function unit 303 may be data stored in the storage unit 301, or may be data that has been communicated with another NAN device via the later-described communication unit 306.

The input unit 304 accepts various types of operations from the user. An output unit 305 performs various types of output for the user. Here, output performed by the output unit 305 includes at least one of on-screen display, output of sound using a speaker, output of vibration, etc. Note that both of the input unit 304 and the output unit 305 may be realized by one module, as with a touchscreen panel.

The communication unit 306 controls wireless communication conforming to the IEEE 802.11 series, and controls IP (Internet Protocol) communication. The communication unit 306 also transmits and receives a wireless signal for wireless communication by controlling an antenna 307. The NAN device 101 communicates such contents as image data, document data, and video data with another NAN device via the communication unit 306. The communication unit 306 has a transmission function and a reception function, and can switch between an enabled state and a disabled state of each of these functions in response to an instruction from the control unit 302. It will be assumed that each of the transmission function and the reception function consumes power when in the enabled state, and consumes no power or can operate with power consumption lower than power consumption in the enabled state when in the disabled state.

Figure 4:
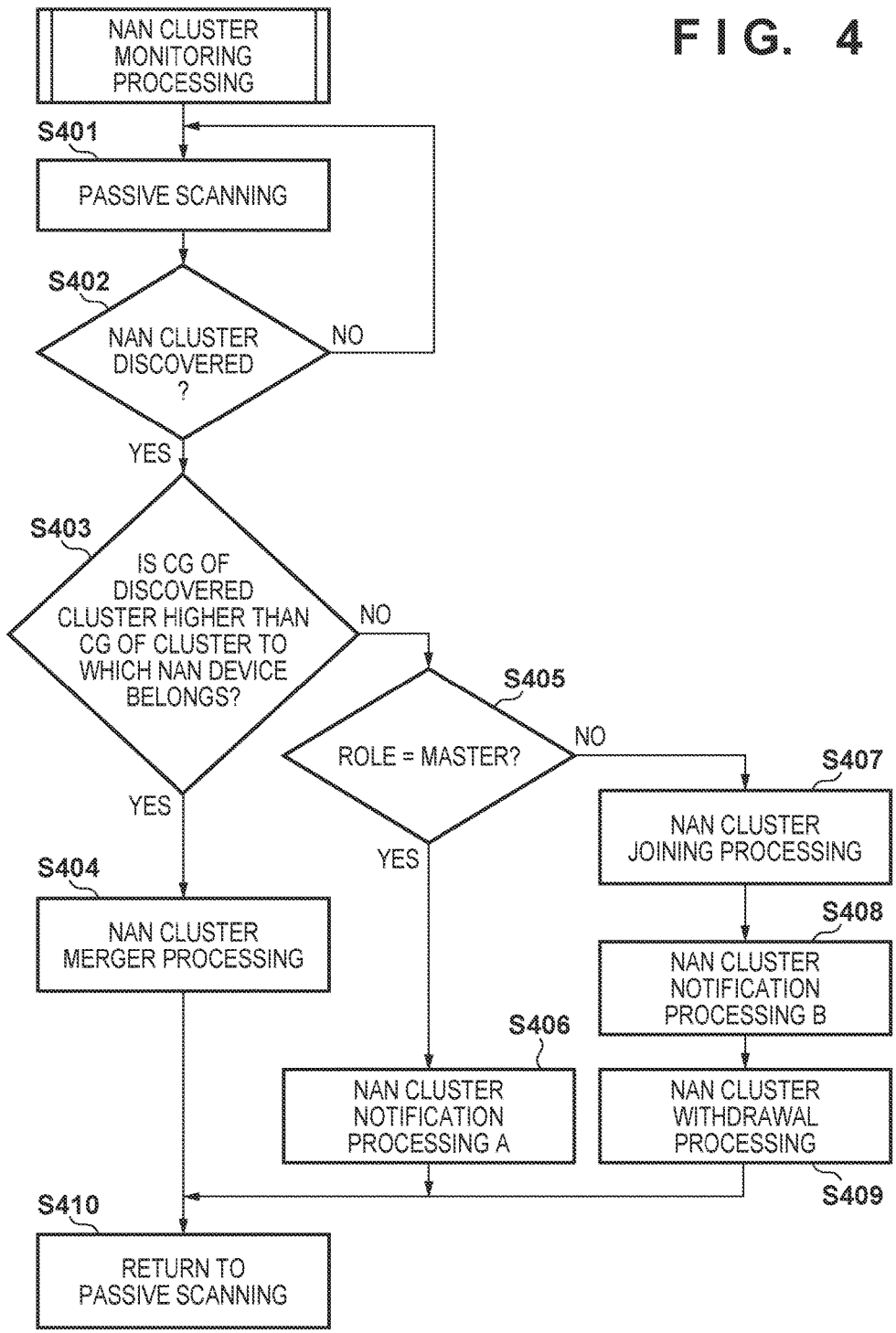
FIG. 4 is a flowchart of NAN cluster monitoring processing according to a first embodiment.

NAN cluster monitoring processing by a NAN device according to the present embodiment will now be described with reference to FIG. 4. The NAN device switches subsequent processing in accordance with Cluster Grade of a NAN cluster that has been discovered by monitoring. FIG. 4 is a flowchart of the NAN cluster monitoring processing according to the present embodiment. In the present description, it will be assumed that the NAN cluster monitoring processing is initiated when the NAN device 101 joins the NAN cluster 106. Note that the NAN device 101 may join the NAN cluster 106 upon initiating the NAN functions and discovering the NAN cluster 106 formed by the NAN device 102, or the NAN device 101 may form the NAN cluster by itself. The NAN functions may be initiated when, for example, the image sharing service application that uses NAN is activated, and may be initiated when a power source of the NAN device 101 is turned ON.

When the NAN cluster monitoring processing has been executed, the NAN device 101 initiates passive scanning in step S401. In the present embodiment, the NAN device 101 scans channel 6. Although scanning is performed at least during a DW0 period of the NAN cluster 106 (DW0 is a specific DW that arrives periodically), it may also be performed in other periods. The NAN device 101 increases the probability of receiving such signals as Discovery Beacon and Synchronization Beacon transmitted by a NAN device belonging to another NAN cluster by performing scanning in non-DW0 periods. As a result, the NAN device 101 increases the probability of discovering another NAN cluster other than the NAN cluster to which it belongs.

At this time, it is determined that a NAN cluster has been discovered in step S402 if the NAN device 101 receives Discovery Beacon or Synchronization Beacon from each NAN device belonging to the NAN cluster 107, and it is determined that the NAN cluster has not been discovered if Discovery Beacon or Synchronization Beacon has not been received. If the NAN cluster has not been discovered (NO of step S402), the processing returns to passive scanning of step S401 again.

If the NAN cluster 107 has been discovered in step S402 (YES of step S402), the NAN device 101 compares Cluster Grade of the NAN cluster 107 included in Discovery Beacon or Synchronization Beacon with Cluster Grade of the NAN cluster 106 to which it belongs.

If Cluster Grade of the NAN cluster 107 (the discovered NAN cluster) is higher than that of the NAN cluster 106 (the NAN cluster to which the NAN device 101 belongs) (YES of step S403), the NAN device 101 executes NAN cluster merger processing in step S404. The details of the NAN cluster merger processing will be explained later in the description of FIG. 5. If Cluster Grade of the NAN cluster 107 is lower than (or equal to) that of the NAN cluster 106 (NO of step S403), processing is switched in accordance with the role of the NAN device 101 within the NAN cluster 106 in step S405.

In step S405, the NAN device 101 determines the role of itself within the NAN cluster 106. If the role of the NAN device 101 is Master (YES of step S405), the NAN device 101 executes NAN cluster notification processing A in step S406. In step S406 (the NAN cluster notification processing A), the NAN device 101 notifies the NAN devices belonging to the NAN cluster 107 of the existence of the NAN cluster 106 by transmitting Discovery Beacon including information of the NAN cluster 106 within a DW period of the NAN cluster 107. Note that the NAN device 101 may transmit Discovery Beacon in the DW0 period to notify the NAN devices in the NAN cluster 107 of this Discovery Beacon more reliably. This is because, according to the NAN specifications, all the NAN devices belonging to the NAN cluster 107 are in a state where they are capable of receiving in the DW0 period. At this time, the NAN device 101 may perform transmission after waiting until DW0, or may perform transmission in every DW until DW0.

If the role of the NAN device 101 is not Master (NO of step S405), the NAN device 101 cannot transmit the aforementioned Discovery Beacon, and thus executes NAN cluster joining processing in step S407. In step S407 (the NAN cluster joining processing), the NAN device 101 joins the NAN cluster discovered in step S402 (the NAN cluster 107). At this time, the NAN device 101 is in a state where it is joining both of the NAN cluster 106 and the NAN cluster 107 temporarily. Once the NAN device 101 has joined the NAN cluster 107, it initiates a series of processing corresponding to the NAN cluster 107, such as monitoring of a DW period, Beacon transmission in accordance with the role, and a role shift, in line with the NAN specifications.

According to the NAN specifications, a NAN device immediately after joining a new cluster operates as Master within the new cluster. By making use of this, in step S408 (the NAN cluster notification processing B), the NAN device 101 transmits Synchronization Beacon including information of the NAN cluster 106 to other NAN devices belonging to the NAN cluster 107 in a DW period of the NAN cluster 107. For example, NAN IE with A3 address field including Cluster ID corresponding to the NAN cluster 106 that made the discovery is appended to this Synchronization Beacon. In this way, the NAN device 101 can notify the NAN devices 103, 104, and 105 of the existence of the NAN cluster 106.

Note that the NAN device 101 may transmit this Synchronization Beacon in the DW0 period to notify the NAN devices in the NAN cluster 107 of this Synchronization Beacon more reliably. This is because, according to the NAN specifications, all the NAN devices belonging to the NAN cluster 107 are in a state where they are capable of receiving Synchronization Beacon in the DW0 period. At this time, the NAN device 101 may transmit Synchronization Beacon after waiting until DW0, or may transmit Synchronization Beacon in every DW until DW0. In this case, as multiple DWs are waited for until the DW0 period, there is a possibility that the role of the NAN device 101 shifts to Non-Master Non-Sync. To prevent this, the NAN device 101 may set Master Preference in the NAN cluster 107 to a large value. The foregoing method can notify the NAN devices belonging to the NAN cluster 107, excluding the NAN device 101, of the existence of the NAN cluster 106.

After transmitting the aforementioned Synchronization Beacon, the NAN device 101 executes NAN cluster withdrawal processing in step S409. In step S409 (the NAN cluster withdrawal processing), the NAN device 101 withdraws from the NAN cluster 107. Once the NAN device 101 has withdrawn from the NAN cluster 107, it stops the series of processing corresponding to the NAN cluster 107, which was initiated upon joining this NAN cluster.

After finishing the processing of step S404 (the NAN cluster merger processing), step S406 (the NAN cluster notification processing A), and step S409 (the NAN cluster withdrawal processing), the NAN device 101 continues the NAN cluster monitoring processing by returning to the first passive scanning in step S410. Note that although the end of the NAN cluster monitoring processing is not mentioned in the present embodiment, the NAN cluster monitoring processing may be ended when the image sharing service application that uses NAN is ended, or may be ended when the power source of the NAN device 101 is turned OFF, for example.

Figure 5:
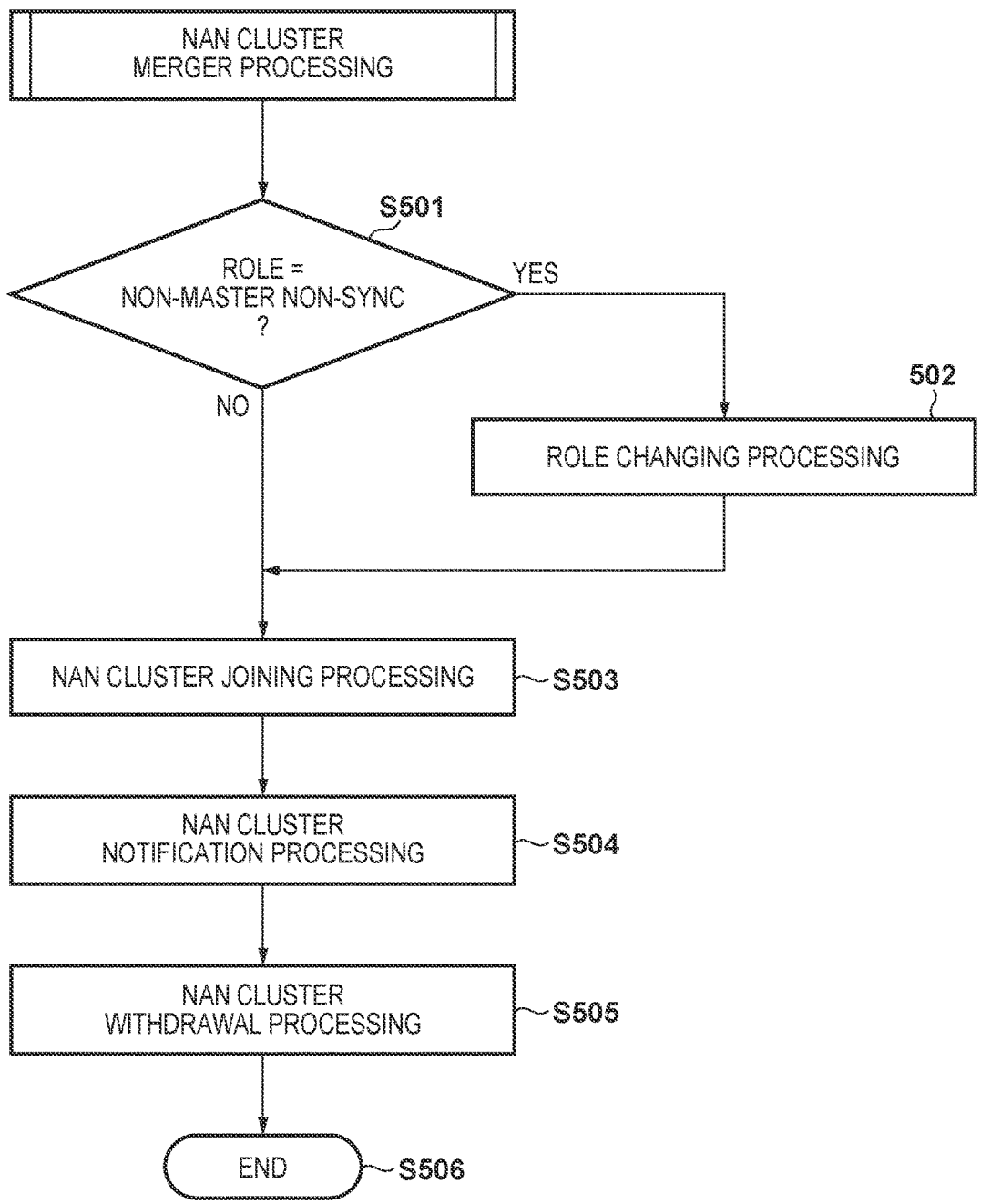
FIG. 5 is a flowchart of NAN cluster merger processing according to the first embodiment.

FIG. 5 is a flowchart of the NAN cluster merger processing according to the present embodiment as the processing of step S404 of FIG. 4. To further concretize the description, the following describes the operations in a case where the NAN device 103 discovered the NAN cluster 106 in step S402 of FIG. 4 as an example.

In step S501, the NAN device 103 determines the role of itself within the NAN cluster 107, and switches processing in accordance with the determination result. If the role of the NAN device 103 is Non-Master Non-Sync (YES of step S501), the NAN device 103 executes role changing processing and changes the role to Non-Master Sync or Master in step S502. The processing for changing the role will be described later. By thus changing the role, the NAN device 103 can transmit Synchronization Beacon and notify other NAN devices (the NAN devices 104 and 105) within the NAN cluster 107 of NAN cluster information in step S504 (the NAN cluster notification processing) to follow.

A description is now given of the processing for deciding on the role and changing the role. According to the NAN standard, each NAN device decides on which one of the following three roles it plays: Master, Non-Master Sync, and Non-Master Non-Sync. Furthermore, according to the NAN standard, every NAN device that has generated a NAN cluster and joined a NAN cluster plays a role of Master at first. Thereafter, each NAN device changes the role of itself in accordance with an RSSI (Received Signal Strength Indication) value in Synchronization Beacon received from a Master device within a DW period, as well as Master Rank, an AMR value, and a Hop Count Field value within Synchronization Beacon. Here, as the RSSI value is the strength of received radio waves, the role could possibly shift depending on whether there is a NAN device with high Master Rank nearby. The higher Master Rank of a NAN device, the higher the likelihood that the NAN device becomes Master, followed by Non-Master Sync and Non-Master Non-Sync in this order. Although the role decision may be finished by determining that the role decision came to an end when the role has not changed over two or more DW periods, no limitation is intended in this regard. Note that there is a possibility of a change in the role upon reception of Synchronization Beacon within a DW period or at the end of a DW period.

In step S502, for example, the NAN device 103 changes Master Rank by changing Master Preference so as to change the role. Also, the NAN device 103 makes an attempt to shift from Non-Master Non-Sync to Non-Master Sync or Master with the elapse of a DW period. If the intended shift does not occur, the NAN device 103 may change Master Preference again. At this time, if Master Rank of the NAN device 103 becomes highest within the NAN cluster 107, there is a possibility that this NAN device becomes Anchor Master and Cluster Grades are updated. If a magnitude relationship between Cluster Grades is reversed, processing becomes complicated; for this reason, it will be assumed here that the NAN device 103 changes Master Preference in a range where Cluster Grade of the NAN cluster 107 does not exceed Cluster Grade of the NAN cluster 106.

If the role of itself is not Non-Master Non-Sync in step S501 (NO of step S501), or after finishing the role changing processing in step S502, the NAN device 103 executes the NAN cluster joining processing in step S503. That is to say, the NAN device 103 executes the NAN cluster joining processing to join the NAN cluster 106 discovered in the processing of step S402 of FIG. 4. As the processes in the NAN cluster joining processing of step S503 are the same as the processing of step S407 of FIG. 4, the details thereof will be omitted.

Next, in step S504, the NAN device 103 executes the NAN cluster notification processing. For example, the NAN device 103 transmits Synchronization Beacon including information of the newly-discovered NAN cluster 106 in a DW period of the NAN cluster 107 to which it originally belonged. At this time, the NAN device 103 may transmit this Synchronization Beacon after waiting until DW0, or may continue the transmission in every DW until DW0. In this way, the NAN device 103 can notify the NAN devices 104 and 105 of the information of the NAN cluster 106. Here, there is a possibility that the NAN devices 104 and 105, too, similarly discovered the NAN cluster 106 when the NAN device 103 discovered the NAN cluster 106 in step S402 of FIG. 4. However, there is also a case where the NAN devices 104 and 105 cannot discover the NAN cluster 106 because, for example, they were present in a range that is not reached by radio waves, or they were not in a receiving state. For this reason, in step S504, the NAN device 103 transmits Synchronization Beacon and sends a notification about the discovered NAN cluster (the NAN cluster 106) again so that the merger between the NAN clusters can be facilitated with a higher probability.

According to the NAN specifications, in order to save network bands and reduce the processing load on and the power consumption by each NAN device, restrictions are placed on signals that can be transmitted by each role. For example, Discovery Beacon can be transmitted only by Master, and Synchronization Beacon can be transmitted only by Master and Non-Master Sync. Therefore, a NAN device serving as Non-Master Non-Sync cannot send Synchronization Beacon. However, in the present embodiment, even though the NAN device 103 has a role of Non-Master Non-Sync at first, it changes the Non-Master role in step S502 and thus can transmit Synchronization Beacon in step S504.

When the NAN device 103 has ended the notification of the information of the NAN cluster 106 within the NAN cluster 107 by transmitting Synchronization Beacon, it executes the NAN cluster withdrawal processing and withdraws from the NAN cluster 107 in step S505. The details of the NAN cluster withdrawal processing of step S505 will be omitted as it is the same as the processing of step S409.

Note that in an exemplary modification of the processing shown in FIG. 5, the NAN device 103 may execute the NAN cluster joining processing of step S503 before the processing of step S501, or may execute the same before or after the NAN cluster withdrawal processing of step S505.

Furthermore, the NAN specifications state a restriction whereby, once a NAN device has changed Master Preference, it must not change Master Preference for a certain period (until 240 DWs elapse). Therefore, when the NAN device 103 cannot execute the role changing processing immediately in step S502, it changes the role after waiting until the time when the role can be changed. In this case, as mentioned earlier, the NAN device 103 can notify a larger number of NAN devices (the NAN devices 104 and 105) of the existence of the discovered cluster (the NAN cluster 106) with a high probability. Meanwhile, with priority on immediate processing, the NAN device 103 may not execute the role changing processing of step S502 and proceed to the NAN cluster joining processing of step S503 without waiting. In this case, the NAN device 103 cannot execute step S504 because it cannot transmit Synchronization Beacon. Therefore, the NAN device 103 can proceed to the NAN cluster withdrawal processing of step S505 without executing the processing of step S504.

Figure 6:
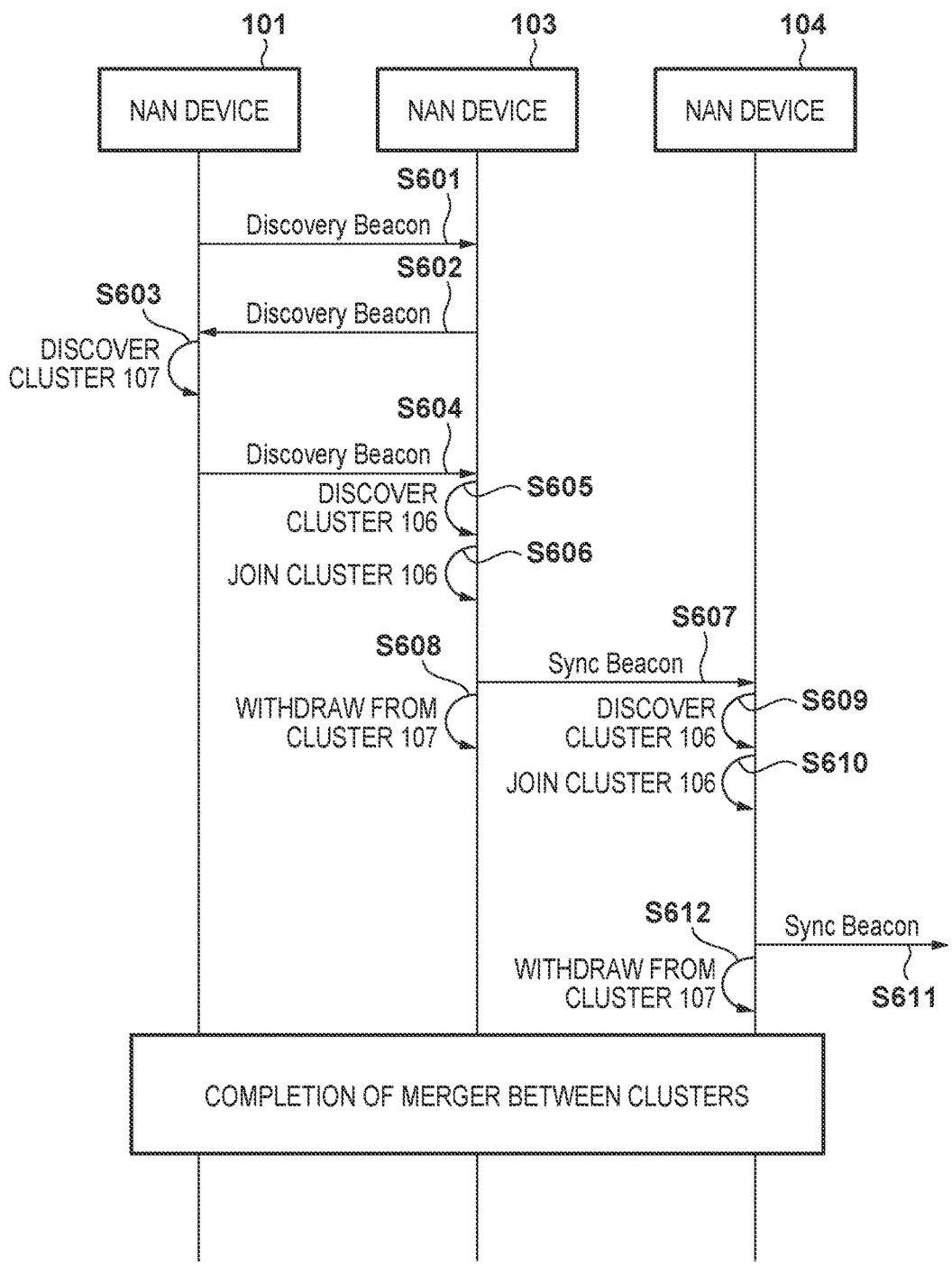
FIG. 6 is a sequence diagram for a case where a NAN device 101 according to the first embodiment is Master.

FIG. 6 is an exemplary sequence diagram according to the present embodiment. Here, the operations of the NAN devices 101, 103, and 104 will be described as an example, and a description of the operations of the NAN devices 102 and 105 will be omitted for the sake of simple explanation.

First of all, assume that the NAN functions of the NAN devices 101, 103, and 104 have been activated by the users of the devices, and each of the NAN clusters 106 and 107 shown in FIG. 1 has been formed. Also assume that the NAN device 101 and the NAN device 103 have a role of Master, and the NAN device 104 has a role of Non-Master Sync. Furthermore, it will be assumed that the NAN device 101 is intended to search for an image sharing service, and the NAN device 104 can provide the image sharing service. These assumptions are made to give a more specific description, and the embodiment is not limited to them.

At the time of the initiation of the sequence, the NAN devices 101, 103, and 104 have already joined their respective NAN clusters, and the NAN cluster monitoring processing is in execution. Each of the NAN devices 101, 103, and 104 executes passive scanning (step S401 of FIG. 4), and transmits Beacon in accordance with the role.

It will be assumed that the NAN device 101 transmits Discovery Beacon including information of the NAN cluster 106 in step S601, but the NAN device 103 is not in a receiving state and thus cannot receive the same at this time. It will also be assumed that, in the meantime, the NAN device 103 transmits Discovery Beacon including information of the NAN cluster 107 in step S602, and the NAN device 101 has received the same. Accordingly, the NAN device 101 determines that it has discovered the NAN cluster 107 in step S603. The discovery of the NAN cluster 107 by the NAN device 101 in step S603 corresponds to YES of step S402 in FIG. 4. Subsequently, the NAN device 101 compares Cluster Grade of the NAN cluster 106 to which it belongs with Cluster Grade of the discovered NAN cluster 107. In the present example, as Cluster Grade of the NAN cluster 107 is low (NO of step S403) and the role of the NAN device 101 is Master (YES of step S405), the NAN device 101 executes the NAN cluster notification processing A (step S406).

As the NAN cluster notification processing A, the NAN device 101 transmits Discovery Beacon including information of the NAN cluster 106 in a DW period of the NAN cluster 107 in step S604. Note that the NAN device 101 may transmit this Discovery Beacon in the DW0 period to notify the NAN device 103 of this Discovery Beacon more reliably. This is because, according to the NAN specifications, all the NAN devices belonging to the NAN cluster 107 are in a state where they are capable of receiving in the DW0 period. At this time, the NAN device 101 may transmit the foregoing Discovery Beacon after waiting until DW0, or may transmit the same in every DW until DW0.

The NAN device 103 that received Discovery Beacon in step S604 discovers the NAN cluster 106 in step S605. The discovery of the NAN cluster 106 by the NAN device 103 in step S605 corresponds to YES of step S402 in FIG. 4. Subsequently, the NAN device 103 compares Cluster Grade of the NAN cluster 107 to which it belongs with Cluster Grade of the discovered NAN cluster 106. In the present example, as Cluster Grade of the discovered NAN cluster 106 is high (YES of step S403), the NAN device 103 executes the NAN cluster merger processing (step S404).

In FIG. 5 for describing the NAN cluster merger processing, the NAN device 103 executes the NAN cluster joining processing (step S503) as it has a role of Master. This NAN cluster joining processing corresponds to step S606. Subsequently, the NAN device 103 transmits Synchronization Beacon including information of the NAN cluster 106 in a DW period of the NAN cluster 107 (steps S504 and S607). Note that the NAN device 103 may transmit this Synchronization Beacon in the DW0 period to notify the NAN device 104 of this Synchronization Beacon more reliably. This is because, according to the NAN specifications, all the NAN devices belonging to the NAN cluster 107 are in a state where they are capable of receiving in the DW0 period. At this time, the NAN device 103 may transmit the foregoing Discovery Beacon after waiting until DW0, or may transmit the same in every DW until DW0. After the notification of Synchronization Beacon, the NAN device 103 executes the NAN cluster withdrawal processing (steps S505 and S608).

The NAN device 104 that received Synchronization Beacon including the information of the NAN cluster 106 from the NAN device 103 in step S607 executes the processes of steps S609 to S612. As the processes of steps S609 to S612 are similar to the processes of steps S605 to S608 executed by the NAN device 103, a description thereof will be omitted.

Through the foregoing processes, all of the NAN devices 101, 103, and 104 are merged into the NAN cluster 106. As a result of the merger between the clusters, the NAN device 103 can discover the image sharing service provided by the NAN device 104. Specifically, the NAN device 101 performs Broadcast transmission of Subscribe within a DW period of the NAN cluster 106, and accordingly, the NAN device 104 receives the same and returns Publish. Alternatively, the NAN device 101 may discover the image sharing service provided by the NAN device 104 by receiving Publish transmitted by the NAN device 104 without transmitting Subscribe.

Figure 7:
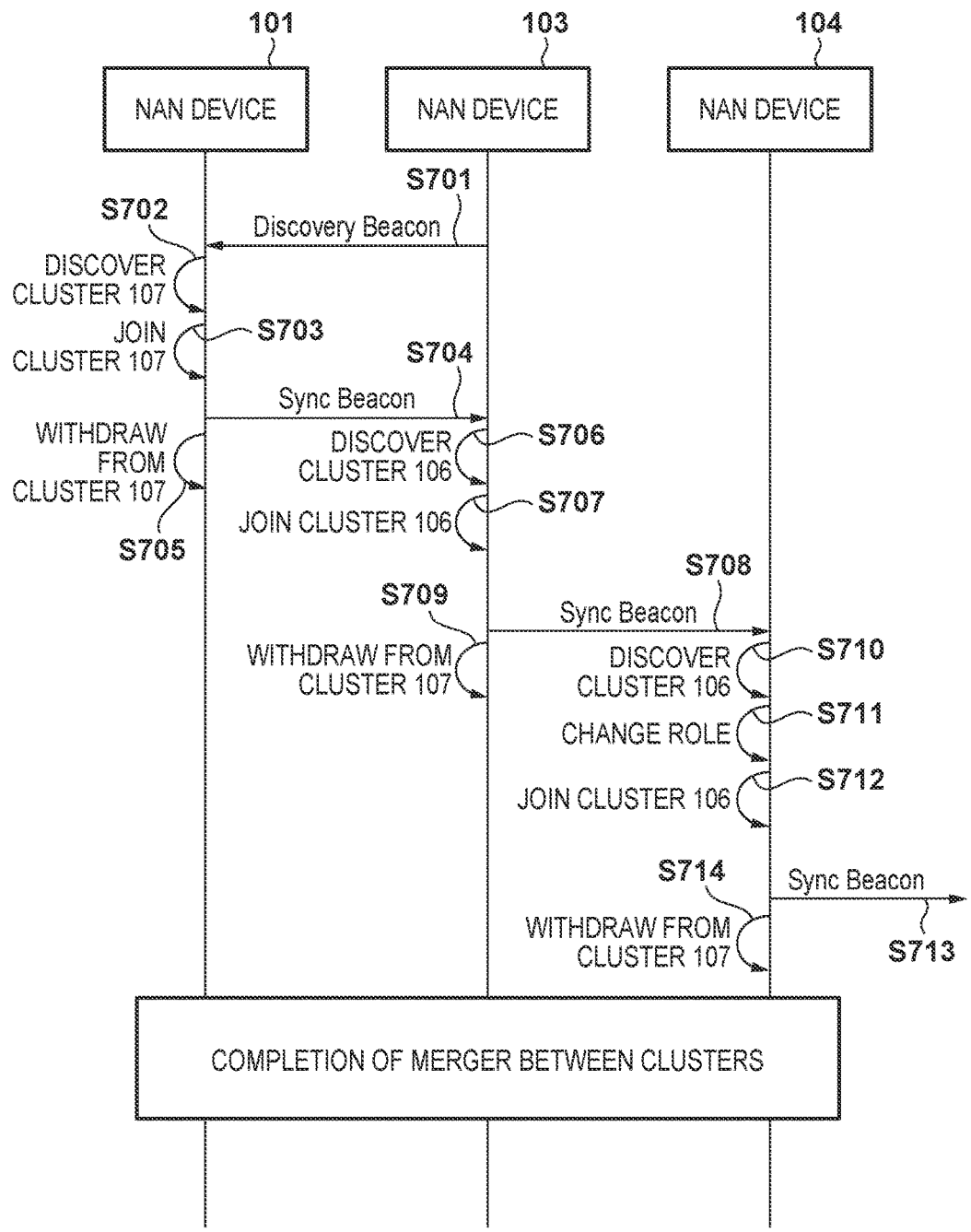
FIG. 7 is a sequence diagram for a case where the NAN device 101 according to the first embodiment is not Master.

FIG. 7 is another sequence diagram according to the present embodiment. Here, similarly to FIG. 6, the operations of the NAN devices 101, 103, and 104 will be described as an example, and a description of the operations of the NAN devices 102 and 105 will be omitted for the sake of simple explanation.

First of all, assume that the NAN functions of the NAN devices 101, 103, and 104 have been activated by the users of the devices, and each of the NAN clusters 106 and 107 shown in FIG. 1 has been formed. Also assume that the role of the NAN device 101 is Non-Master Sync (that is to say, not Master), the role of the NAN device 103 is Master, and the role of the NAN device 104 is Non-Master Non-Sync. These assumptions are made to give a more specific description, and the embodiment is not limited to them.

As the process of step S701 is similar to the process of step S602 of FIG. 6, a description thereof will be omitted. In step S702, the NAN device 101 discovers the cluster 107; the discovery of the NAN cluster 107 in step S701 corresponds to NO of step S403 in FIG. 4, and the NAN device 101 compares Cluster Grade of the NAN cluster 106 to which it belongs with Cluster Grade of the discovered NAN cluster 107. In the present example, as Cluster Grade of the NAN cluster 107 is low (NO of step S403) and the role of the NAN device 101 is not Master (NO of step S405), the NAN device 101 executes the NAN cluster joining processing to join the NAN cluster 107 (step S407). Consequently, in step S703, the NAN device 101 joins the NAN cluster 107.

Next, in step S704, the NAN device 101 notifies the NAN device 103 of the existence of the cluster 106 by transmitting Synchronization Beacon including information of the NAN cluster 106 in a DW period of the cluster 107. The process of step S704 is equivalent to the NAN cluster notification processing B in step S408 of FIG. 4. Note that the NAN device 101 may transmit this Discovery Beacon in the DW0 period to notify the NAN device 103 of this Synchronization Beacon more reliably. Upon completion of the notification of the cluster 106 to the NAN device 103, the NAN device 101 withdraws from the NAN cluster 107 and returns to the original state in step S705. The process of step S705 is equivalent to the NAN cluster withdrawal processing in step S409 of FIG. 4.

As the processes of steps S706 to S710 are similar to the processes of steps S605 to S609 of FIG. 6, a description thereof will be omitted. In step S710, the NAN device 104 discovers the NAN cluster 106. The discovery of the NAN cluster 106 by the NAN device 104 in step S710 corresponds to YES of step S402 in FIG. 4. Subsequently, the NAN device 104 compares Cluster Grade of the NAN cluster 107 to which it belongs with Cluster Grade of the discovered NAN cluster 106. In the present example, as Cluster Grade of the discovered NAN cluster 106 is high (YES of step S403), the NAN device 104 executes the NAN cluster merger processing (step S404).

In FIG. 5 for describing the NAN cluster merger processing, as the NAN device 104 has a role of Non-Master Non-Sync (YES of step S501), it changes the role of itself from Non-Master Non-Sync to Non-Master Sync or Master by executing the role changing processing (steps S502 and S711). Consequently, the NAN device 104 becomes capable of facilitating the merger by notifying other NAN devices belonging to the NAN cluster 107 of the existence of the cluster 106. This is because the NAN devices belonging to the cluster 107 that were not capable of receiving Synchronization Beacon transmitted in steps S704 and S708 can receive Synchronization Beacon transmitted in step S713. In this case, these NAN devices can not only join the cluster 106, but also propagate information for the merger by similarly transmitting Synchronization Beacon. As the processes of steps S712 to S714 are similar to the processes of steps S610 to S612 of FIG. 6, a description thereof will be omitted.

As described above, according to the present embodiment, when a NAN device has discovered another NAN cluster, it can facilitate the merger processing by transmitting a predetermined signal in the above-described manner, even in a case where Cluster Grade of a NAN cluster to which the NAN device belongs is higher than Cluster Grade of another NAN cluster. Furthermore, in a case where Cluster Grade of the NAN cluster to which the NAN device belongs is lower than Cluster Grade of another NAN cluster and the role of the NAN device is Non-Master Non-Sync, the NAN device can facilitate the merger processing by changing the role. As a result of the merger between the NAN clusters, the NAN device has a higher possibility of receiving the benefit of a desired service.

Second Embodiment

In the first embodiment, if the role of a NAN device is not Master in step S405 of FIG. 4, the NAN device temporarily joins a discovered NAN cluster and executes the NAN cluster notification processing B (steps S407 and 408). The present embodiment introduces an alternative example in which the role of the NAN device is changed to Master. In the present embodiment, the differences from the first embodiment will be described.

Figure 8:
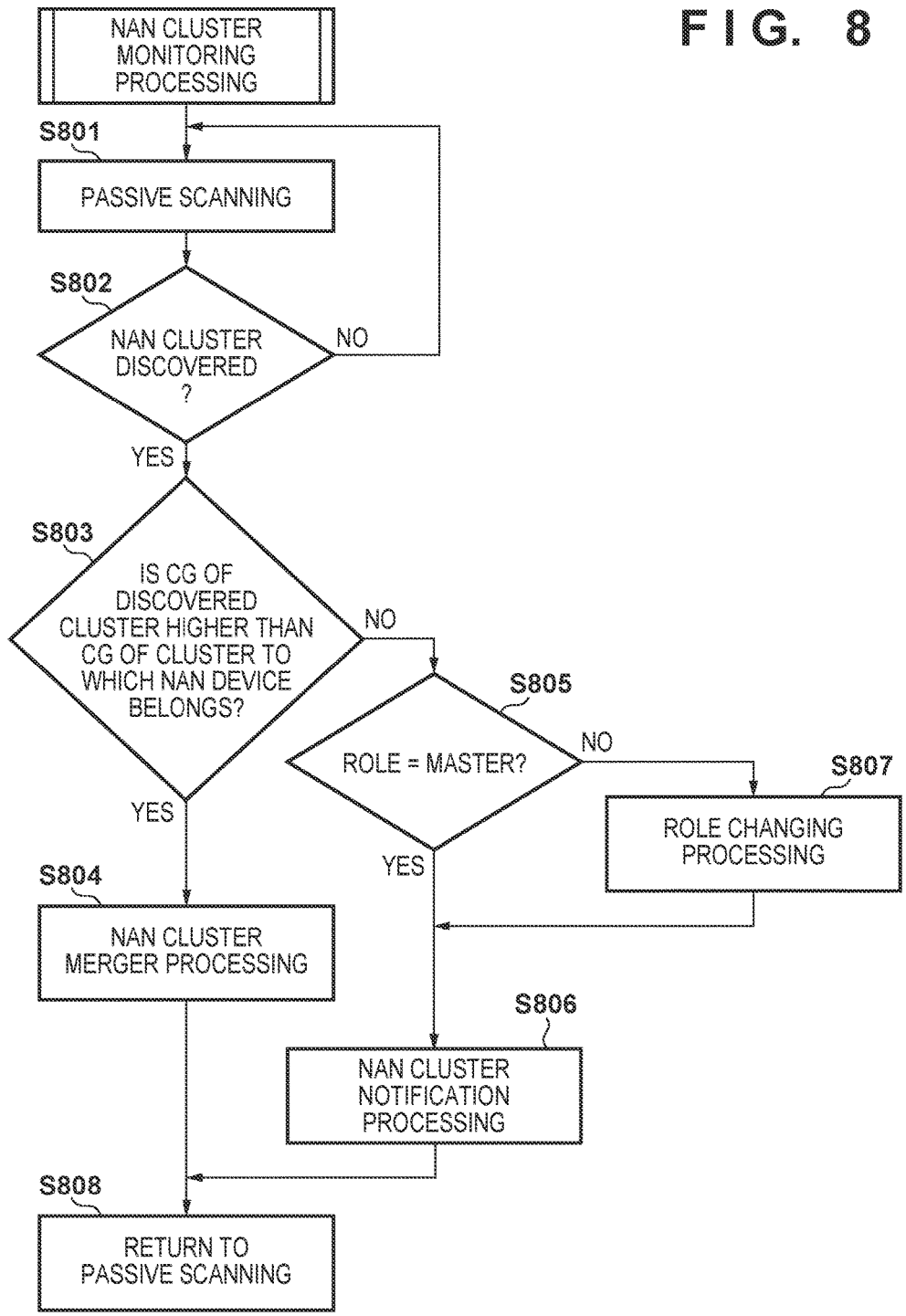
FIG. 8 is a flowchart of NAN cluster monitoring processing according to a second embodiment.

FIG. 8 is a flowchart of NAN cluster monitoring processing according to the present embodiment. The processes of steps S801 to S804 are similar to the processes of steps S401 to S404 in FIG. 4, the processing of step S806 is similar to the processing of step S406 in FIG. 4, and the process of step S808 is similar to the process of step S410 in FIG. 4; therefore, a description thereof will be omitted.

If the role of the NAN device is not Master in step S805 (NO of step S805), the NAN device executes role changing processing in step S807. The processing of step S807 is similar to the processing of step S502 in FIG. 5. However, in step S807, the role is changed to the role (Master) for transmitting Discovery Beacon in step S806. By changing the role to Master, the NAN device can perform cluster notification using Discovery Beacon in step S806 without joining a discovered NAN cluster in the case of NO of step S803 and NO of step S805.

Figure 9:
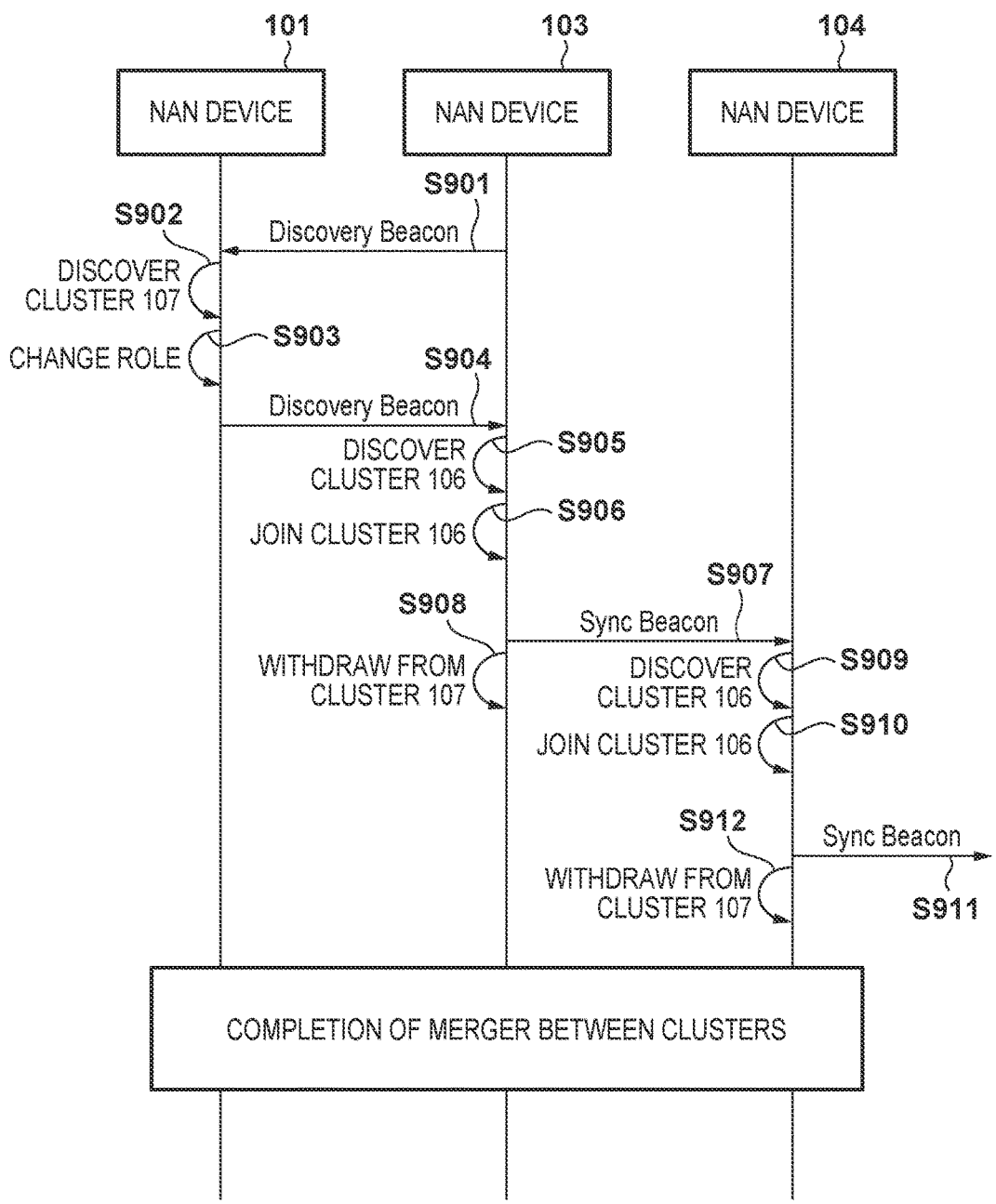
FIG. 9 is a sequence diagram according to the second embodiment.

FIG. 9 is a sequence diagram according to the present embodiment. Here, the operations of the NAN devices 101, 103, and 104 will be described as an example, and a description of the operations of the NAN devices 102 and 105 will be omitted for the sake of simple explanation.

First of all, assume that the NAN functions of the NAN devices 101, 103, and 104 have been activated by the users of the devices, and each of the NAN clusters 106 and 107 shown in FIG. 1 has been formed. Also assume that the role of the NAN device 101 is Non-Master Sync, the role of the NAN device 103 is Master, and the role of the NAN device 104 is Master. These assumptions are made to give a more specific description, and the embodiment is not limited to them.

As the processes of steps S901 and S902 are similar to the processes of steps S701 and S702 of FIG. 7, a description thereof will be omitted. When the NAN device 101 discovers the cluster 107 in step S902, the NAN device 101 compares Cluster Grade of the NAN cluster 106 to which it belongs with Cluster Grade of the discovered NAN cluster 107. In the present example, as Cluster Grade of the NAN cluster 107 is low (NO of step S803) and the role of the NAN device 101 is Non-Master Sync (NO of step S805), the NAN device 101 executes the role changing processing (steps S807 and S903). Here, by changing the role to, for example, Master, the NAN device 101 can transmit Discovery Beacon in step S904. In this way, the NAN device 101 can facilitate the merger between the NAN cluster 106 and the NAN cluster 107 without joining the NAN cluster 107 as in the first embodiment. As the processes of steps S904 to S912 are similar to the processes of steps S604 to S612 of FIG. 6, a description thereof will be omitted.

Third Embodiment

The present embodiment introduces an example in which the above-described first embodiment and second embodiment are combined. In the description of FIG. 6 according to the first embodiment, when the role of the NAN device 101 is not Master, the NAN device 101 notifies the NAN device 103 of information of the NAN cluster 106 by joining the NAN cluster 107 and transmitting Synchronization Beacon. On the other hand, in the description of FIG. 9 according to the second embodiment, when the role of the NAN device 101 is not Master, the NAN device 101 notifies the NAN device 103 of information of the NAN cluster 106 by changing the role of itself to Master and transmitting Discovery Beacon without joining the NAN cluster 107.

Incidentally, the NAN specifications state a restriction whereby, once a NAN device has changed Master Preference, it must not change Master Preference for a certain period (until 240 DWs elapse). Accordingly, there could possibly be a case where the NAN device cannot immediately execute the role changing processing (step S807) described in the second embodiment. In this case, the merger can be advanced more immediately by applying the method according to the first embodiment. On the other hand, the second embodiment, which facilitates the merger without joining a discovered cluster, reduces the processing load on a NAN device compared to the first embodiment.

Furthermore, in the first embodiment, as a NAN device joins multiple NAN clusters, the receiving function needs to be enabled in a DW period of each NAN cluster at least. On the other hand, in the second embodiment, a NAN device joins only one NAN cluster, and it is sufficient to enable the receiving function in a DW period of this NAN cluster at least. As a result, the power saving effect of a NAN device is higher in the second embodiment than in the first embodiment. Therefore, when role changing can be performed immediately, a NAN device can proceed with the merger processing more efficiently by applying the method according to the second embodiment.

In view of the above, the present third embodiment introduces an example in which a NAN device switches processing based on a predetermined condition related to whether role changing is possible. The following describes the differences from the first and second embodiments. Note that although the condition related to whether role changing is possible is a temporal condition in the present embodiment, other conditions related to whether role changing is possible can also be applied.

FIG. 10 is a flowchart of NAN cluster monitoring processing according to the present embodiment. The processes of steps S1001 to S1006 are similar to steps S401 to S406 in FIG. 4, the processing of step S1008 is similar to the processing of step S807 in FIG. 8, and the processing of steps S1009 to S1012 are similar to the processing of steps S407 to S410 in FIG. 4; therefore, a description thereof will be omitted.

In step S1007, the NAN device switches processing depending on whether role changing is possible. Whether role changing is possible is determined based on, for example, whether a predetermined time period (240 DWs according to the NAN standard) has elapsed since Master Preference was changed last. If the predetermined time period has elapsed, the NAN device can perform role changing. If role changing is possible (YES of step S1007), the NAN device executes the role changing processing (step S1008); if not possible (NO of step S1007), the NAN device executes the NAN cluster joining processing (step S1009).

Fourth Embodiment

The present embodiment introduces, as an exemplary modification of the first embodiment, an exemplary case where the NAN device 103 knows DW periods in which the NAN device 104 is awake (capable of receiving various types of Beacons) in FIG. 6. The following describes the differences from the first embodiment.

According to the NAN specifications, all the NAN devices within the same cluster need to be awake in DW0, which arrives periodically, among multiple DWs. However, a NAN device with a role of Non-Master Non-Sync need not be awake in DWs other than DW0. At this time, instead of being awake in DWs other than DW0, the Non-Master Non-Sync NAN device may request another NAN device within the same cluster to perform service notification and make a response as a proxy. Furthermore, at this time, the NAN device that makes the request to the proxy (a requesting device) can perform communication efficiently while the requesting device is awake by notifying the NAN device that is requested to act as the proxy (a proxy device) of DW periods in which the requesting device is awake.

In view of the above, in the present embodiment, the NAN device with a role other than Non-Master Non-Sync (the proxy device) executes the NAN cluster notification processing (step S504) of FIG. 5 in DW periods in which the Non-Master Non-Sync NAN device (the requesting device) is awake. In this way, the proxy NAN device can reliably notify the requesting device of a NAN cluster serving as a moving destination.

Figure 11:
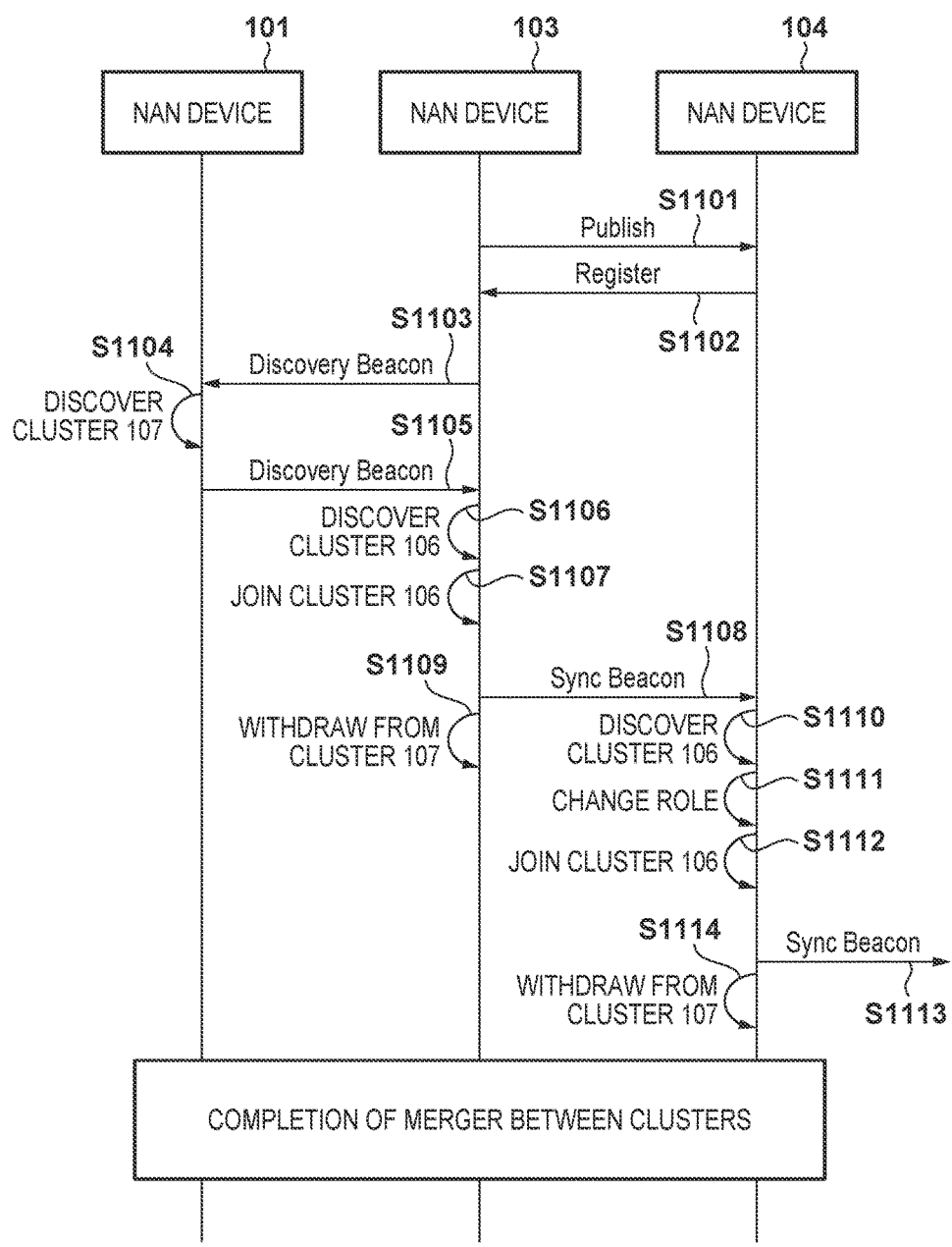
FIG. 11 is a sequence diagram according to a fourth embodiment.

FIG. 11 is a sequence diagram according to the present embodiment. Here, the operations of the NAN devices 101, 103, and 104 will be described as an example, and a description of the operations of the NAN devices 102 and 105 will be omitted for the sake of simple explanation.

First of all, assume that the NAN functions of the NAN devices 101, 103, and 104 have been activated by the users of the devices, and each of the NAN clusters 106 and 107 shown in FIG. 1 has been formed. Also assume that the NAN device 101 and the NAN device 103 have a role of Master, and the NAN device 104 has a role of Non-Master Non-Sync. These assumptions are made to give a more specific description, and the embodiment is not limited to them.

In step S1101, the NAN device 103 sends, within the NAN cluster 107, a notification indicating that it can provide a proxy service using a Publish message. The NAN device 104 receives this notification, and transmits a Register message for making a proxy request to the NAN device 103 in step S1102. The NAN device 104 designates DW periods in which it is awake (e.g., includes information of the DW periods in which it is awake) in this Register message, and notifies the NAN device 103 of this Register message. Note that the method of providing and requesting for the proxy service, as well as the notification method and the designation method regarding awake DW periods, is not limited in this way, and the exchange may be performed using another signal, such as Beacon.

The processes of steps S1103 to S1107 are similar to the processes of steps S602 to S606, and the processes of steps S1109 to S1114 are similar to the processes of steps S709 to S714; therefore, a description thereof will be omitted. In step S1108, the NAN device 103 sends a notification about of the existence of the cluster 106 by transmitting Synchronization Beacon within the NAN cluster 107. In the present embodiment, as the NAN device 103 knows the DW periods in which the NAN device 104 is awake, it can send a notification to the NAN device 104 without waiting for the next DW0 by sending the notification in the earliest DW after the preparation for transmission of Synchronization Beacon was made.

As described above, in the present embodiment, a notification can be sent to the NAN device that has made the proxy request quickly compared to a case where Synchronization Beacon is transmitted in a period (DW0) in which all the NAN devices in a NAN cluster are awake. Furthermore, the method according to the present embodiment is effective in a case where Synchronization Beacon should be reliably transmitted to the NAN device that has made the proxy request but the transmission to other NAN devices is not imperative. When the NAN device that has made the proxy request withdraws from a NAN cluster, it may cancel the proxy request. Upon completion of the merger, the NAN device that has made the proxy request belongs to the same NAN cluster as the NAN device that has been requested to be the proxy.

Other Embodiments

In each of the above-described embodiments, a wireless LAN system conforming to the NAN standard has been described as one example of a communication system that performs wireless communication by forming a group made up of multiple communication apparatuses. However, besides the NAN, the present invention can be applied to a communication system that can merge multiple groups that are each made up of multiple communication apparatuses when such multiple groups exist. The wireless communication method is not limited to a wireless LAN conforming to the IEEE 802.11 series, and other communication methods, such as Bluetooth® and Zigbee, may be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-006101, filed Jan. 17, 2017 which is hereby incorporated by reference herein in its entirety.

What is claimed is:

1. A communication apparatus capable of communicating with another communication apparatus in a network conforming to NAN (Neighbor Awareness Networking), the communication apparatus comprising:
    a detection unit configured to, while joining a first NAN cluster included among a plurality of NAN clusters, detect an existence of a second NAN cluster included among the plurality of NAN clusters;
    a comparison unit configured to compare an attribute value of the second NAN cluster with an attribute value of the first NAN cluster; and
    a transmission unit configured to, when the attribute value of the second NAN cluster is lower than the attribute value of the first NAN cluster, transmit information indicating an existence of the first NAN cluster to the second NAN cluster.

2. The communication apparatus according to claim 1, wherein
    when a role of the communication apparatus in the first NAN cluster is Master, the transmission unit transmits Discovery Beacon including the information indicating the existence of the first NAN cluster.

3. The communication apparatus according to claim 1, further comprising
    a changing unit configured to change a role of the communication apparatus, wherein
    when the role of the communication apparatus in the first NAN cluster is not Master, the changing unit changes the role of the communication apparatus to Master, and the transmission unit transmits Discovery Beacon including the information indicating the existence of the first NAN cluster.

4. The communication apparatus according to claim 1, wherein
    when a role of the communication apparatus in the first NAN cluster is not Master, the transmission unit transmits Synchronization Beacon including the information indicating the existence of the first NAN cluster.

5. The communication apparatus according to claim 1, further comprising
    a changing unit configured to change a role of the communication apparatus, wherein
    when the role of the communication apparatus in the first NAN cluster is not Master,
    the changing unit changes the role of the communication apparatus to Master and the transmission unit transmits Discovery Beacon including the information indicating the existence of the first NAN cluster in a case where a predetermined condition is satisfied, and
    the transmission unit transmits Synchronization Beacon including the information indicating the existence of the first NAN cluster in a case where the predetermined condition is not satisfied.

6. The communication apparatus according to claim 5, wherein
    the predetermined condition is related to whether a predetermined period has elapsed at a time when the existence of the second NAN cluster is detected by the detection unit.

7. The communication apparatus according to claim 2, wherein
    the transmission unit transmits the Discovery Beacon in a DW (Discovery Window) of the second NAN cluster.

8. The communication apparatus according to claim 4, wherein
    the transmission unit transmits the Synchronization Beacon in a DW (Discovery Window) of the second NAN cluster.

9. The communication apparatus according to claim 1, wherein
    when the attribute value of the second NAN cluster is higher than the attribute value of the first NAN cluster, the transmission unit transmits Synchronization Beacon including information indicating the existence of the second NAN cluster to the first NAN cluster.

10. The communication apparatus according to claim 9, further comprising
    a changing unit configured to change a role of the communication apparatus, wherein
    when the role of the communication apparatus in the first NAN cluster is Non-Master Non-Sync, the changing unit changes the role of the communication apparatus to Master or Non-Master Sync, and the transmission unit transmits the Synchronization Beacon.

11. The communication apparatus according to claim 9, wherein
    the transmission unit transmits the Synchronization Beacon in a time period in which another communication apparatus joining the first NAN cluster is capable of receiving the Synchronization Beacon.

12. The communication apparatus according to claim 11, wherein
    the time period is a DW (Discovery Window) that has been designated by the another communication apparatus from among DWs that have been set for the first NAN cluster.

13. A communication apparatus that is joining a group made up of a plurality of communication apparatus and is capable of communicating with another communication apparatus joining the group, the communication apparatus comprising:
    a detection unit configured to detect a second group different from a first group joined by the communication apparatus;
    a comparison unit configured to compare an attribute value of the first group with an attribute value of the second group; and
    a transmission unit configured to, when a result of the comparison indicates that the attribute value of the second group is lower than the attribute value of the first group, transmit information indicating an existence of the first group to a communication apparatus joining the second group.

14. A control method for a communication apparatus capable of communicating with another communication apparatus in a network conforming to NAN (Neighbor Awareness Networking), the control method comprising:

while joining a first NAN cluster included among a plurality of NAN clusters that each have a unique attribute value, detecting an existence of a second NAN cluster included among the plurality of NAN clusters;

comparing the attribute value of the second NAN cluster with the attribute value of the first NAN cluster; and when the attribute value of the second NAN cluster is lower than the attribute value of the first NAN cluster, transmitting information indicating an existence of the first NAN cluster to the second NAN cluster.

15. A non-transitory computer-readable storage medium storing a computer program for causing a computer to execute a control method for a communication apparatus capable of communicating with another communication apparatus in a network conforming to NAN (Neighbor Awareness Networking), the control method comprising:

while joining a first NAN cluster included among a plurality of NAN clusters that each have a unique attribute value, detecting an existence of a second NAN cluster included among the plurality of NAN clusters;

comparing the attribute value of the second NAN cluster with the attribute value of the first NAN cluster; and when the attribute value of the second NAN cluster is lower than the attribute value of the first NAN cluster, transmitting information indicating an existence of the first NAN cluster to the second NAN cluster.

* * * * *